Patented Oct. 3, 1944

2,359,391

UNITED STATES PATENT OFFICE 2,359,391

PROCESS FOR PRODUCTION OF HETEROCYCLIC NITROGEN RING COMPOUNDS

George W. Seymour and Victor S. Salvin, Cumberland, Md., assignors to Celanese Corporation of America, a corporation of Delaware No Drawing. Application November 7, 1940, Serial No. 364,689

8 Claims. (Cl. 260—289)

This invention relates to the preparation of dyestuff intermediates, and relates more particularly to the preparation of heterocyclic dyestuff intermediates suitable for coupling to form azo dyestuffs.

An object of our invention is the preparation of heterocyclic dyestuff intermediates.

Another object of our invention is the use of ring-forming agents which are comparatively non-toxic and which may be used with safety.

Other objects of our invention will appear hereinafter from the following detailed description.

In the preparation of dyestuff intermediates by ring-closure of aromatic compounds with aliphatic compounds, halohydrins are frequently employed for the introduction of the aliphatic side chain which is ring-closed to form the cyclic intermediate being prepared. In the preparation of quinoline and benzoquinoline derivatives from aromatic amines, the use of epichlorhydrin has been suggested. While the results obtained using this compound have been fairly satisfactory, the use of this compound on a commercial scale is somewhat hazardous for operators due to its toxic nature. In addition, there are attendant inconveniences in using this material due to the excessive care, and the safe-guards which must be employed.

We have now discovered that excellent ring-closures may be achieved and satisfactory yields obtained when alpha-gamma-glycerol dichlorhydrin is condensed and ring-closed with aromatic amines. While our process is particularly suited for the condensation and ring-closure of alpha-gamma glycerol dichlorhydrin with naphthyl amines for the preparation of benzoquinoline compounds, other aromatic amines such as aniline, substituted anilines such as amino-phenol, chlor-aniline, anisidine, phenetidine, ethyl meta toluidine, mono-ethyl-aniline, and hydroxy-ethyl aniline are also suitable and may be used for the preparation of analogous quinoline derivatives.

The reaction may be generally carried out by reacting the desired aromatic amine with the alpha-gamma-glycerol dichlorhydrin in the presence of an organic solvent and a suitable acid binding agent such as pyridine, quinoline, or iso-quinoline. The suitable solvents are those in which the reactants are soluble, which are inert to the reactants and which are not excessively volatile. Compounds such as amyl alcohol, butyl alcohol and chlorobenzene are excellent solvents for the reaction.

The temperature at which the reactants may be maintained during the course of the reaction will vary depending upon the particular compound being prepared and the particular solvent used in the process. Preferably, the ring-closure reaction is carried out under reflux and the temperature will of course depend upon the boiling point of the solvent being used. When amyl alcohol is used as a solvent, the reaction temperature is about 137° C. Generally temperatures of from about 120° C. to about 160° C. are suitable. To obtain the preliminary coupling of the dichlorhydrin compound and the aromatic amine prior to ring-closure, the reaction mixture is usually maintained at a temperature somewhat lower than that usually necessary for ring-closure. After the coupling has taken place, the temperature may be then raised and the ring-closure reaction carried out.

The time during which the reaction mixture is maintained at reaction temperature may also vary depending upon the compound being prepared. Usually the preliminary coupling at the amino group takes place in from about 2 to 4 hours while the ring-closure at reflux temperature is complete in from about 4 to 8 hours, making a total reaction time of from 6 to 12 hours.

In order further to illustrate our invention but without being limited thereto, the following examples are given:

Example I 160 parts by weight of 1-amino-5-naphthol and 150 parts of α-γ-glycerol dichlorhydrin are dissolved in 400 parts of n-amyl alcohol to which are added 80 parts of pyridine. The mixture is warmed to 80° C. for 3 hours with stirring and then refluxed at 137° C. for 4 hours with constant stirring. When the reaction is complete and the mixture cooled the 3 - hydroxy - 1,2,3,4 - tetrahydro-7-hydroxy-7,8-benzoquinoline produced by the ring-closure is precipitated by the addition of about 1200 parts of acetone and then filtered off. The precipitate is a resinous material which may be coupled with diazotizable amines to form dischargeable azo dyestuffs.

Example II 119 parts of monobutylaniline and 150 parts of α-γ-glycerol dichlorhydrin are dissolved in 400 parts of butyl alcohol to which has been added 80 parts of pyridine. The mixture is warmed to 80° C. for 2 hours with stirring and then refluxed at 120° C. for 4 hours with constant stirring. When reaction is complete, the mixture is cooled. 50 parts of caustic in 500 parts of water are added. Distillation of the butyl alcohol extract under vacuum yields the 1-butyl-3-hydroxy-1-2-3-4-tetrahydro-quinoline which may be coupled with diazotizable amines to form dischargeable azo dyestuffs.

It is to be understood that the foregoing detailed description is merely given by way of illustration and that many variations may be made therein without departing from the spirit of our invention.

Having described our invention, what we desire to secure by Letters Patent is:

1. A process for the production of heterocyclic nitrogen ring compounds which comprises reacting α-γ-glycerol dichlorhydrin with an aryl amine in the presence of a cyclic tertiary base as an acid-binding agent and ring-closing the resulting substituted amine by subjecting the reaction mixture containing the acid-binding agent to the action of heat.

2. A process for the production of heterocyclic nitrogen ring compounds which comprises reacting α-γ-glycerol dichlorhydrin with an aryl amine in an inert solvent in the presence of a cyclic tertiary base as an acid-binding agent and ring-closing the resulting substituted amine by subjecting the reaction mixture containing the acid-binding agent to the action of heat.

3. A process for the production of heterocyclic nitrogen ring compounds which comprises reacting α-γ-glycerol dichlorhydrin with an aryl amine of the benzene series in the presence of a cyclic tertiary base as an acid-binding agent and ring-closing the resulting substituted amine by subjecting the reaction mixture containing the acid-binding agent to the action of heat.

4. A process for the production of heterocyclic nitrogen ring compounds which comprises reacting α-γ-glycerol dichlorhydrin with an aryl amine of the benzene series in an inert solvent in the presence of a cyclic tertiary base as an acid-binding agent and ring-closing the resulting substituted amine by subjecting the reaction mixture containing the acid-binding agent to the action of heat.

5. A process for the production of heterocyclic nitrogen ring compounds which comprises reacting α-γ-glycerol dichlorhydrin with an aryl amine of the naphthalene series in the presence of a cyclic tertiary base as an acid-binding agent and ring-closing the resulting substituted amine by subjecting the reaction mixture containing the acid-binding agent to the action of heat.

6. A process for the production of heterocyclic nitrogen ring compounds which comprises reacting α-γ-glycerol dichlorhydrin with an aryl amine of the naphthalene series in an inert solvent in the presence of a cyclic tertiary base as an acid-binding agent and ring-closing the resulting substituted amine by subjecting the reaction mixture containing the acid binding agent to the action of heat.

7. A process for the production of 3-hydroxy-1,2,3,4-tetrahydro-7-hydroxy-7,8-benzoquinoline which comprises reacting α-γ-glycerol dichlorhydrin with 1-amino-5-naphthol in amyl alcohol containing pyridine as an acid-binding agent and ring-closing the resulting substituted naphthol amine by subjecting the reaction mixture containing pyridine to the action of heat.

8. A process for the production of 1-butyl-3-hydroxy-1,2,3,4-tetrahydro-quinoline which comprises reacting α-γ-glycerol dichlorhydrin with monobutyl aniline in butyl alcohol containing pyridine as an acid-binding agent and ring-closing the resulting substituted amine by subjecting the reaction mixture containing pyridine to the action of heat.

GEORGE W. SEYMOUR.
VICTOR S. SALVIN.